United States Patent
Shimizu et al.

(10) Patent No.: US 8,089,514 B2
(45) Date of Patent: Jan. 3, 2012

(54) MOVING IMAGE COMMUNICATION DEVICE, MOVING IMAGE COMMUNICATION SYSTEM AND SEMICONDUCTOR INTEGRATED CIRCUIT USED FOR COMMUNICATION OF MOVING IMAGE

(75) Inventors: Minako Shimizu, Kyoto (JP); Masahiro Ogawa, Osaka (JP); Taichi Nagata, Osaka (JP)

(73) Assignee: Panasonic Corporation, Osaka (JP)

( * ) Notice: Subject to any disclaimer, the term of this patent is extended or adjusted under 35 U.S.C. 154(b) by 709 days.

(21) Appl. No.: 12/135,645

(22) Filed: Jun. 9, 2008

(65) Prior Publication Data

US 2008/0313683 A1    Dec. 18, 2008

(30) Foreign Application Priority Data

Jun. 13, 2007   (JP) ................................. 2007-156202

(51) Int. Cl.
*H04N 7/18*    (2006.01)
*H04N 7/173*   (2011.01)

(52) U.S. Cl. ......................................... 348/154; 725/94
(58) Field of Classification Search .......... 348/152–155, 348/231.9, 14.1, 14.12, 14.15; 725/94
See application file for complete search history.

(56) References Cited

U.S. PATENT DOCUMENTS

| | | | | |
|---|---|---|---|---|
| 5,768,533 | A | * | 6/1998 | Ran ............................... 709/247 |
| 6,097,429 | A | * | 8/2000 | Seeley et al. .................. 348/154 |
| 6,591,396 | B1 | | 7/2003 | Honda |
| 6,724,421 | B1 | * | 4/2004 | Glatt .............................. 348/154 |
| 6,931,658 | B1 | | 8/2005 | Kawamura et al. |
| 7,277,122 | B2 | * | 10/2007 | Sakai ............................. 348/143 |

FOREIGN PATENT DOCUMENTS

JP    2003-018525    1/2003

* cited by examiner

*Primary Examiner* — David Ometz
*Assistant Examiner* — Carramah J Quiett
(74) *Attorney, Agent, or Firm* — McDermott Will & Emery LLP (57) ABSTRACT

A communication processor sets a storage request signal to be effective when it is judged that a packet cannot be transmitted and sets the storage request signal to be ineffective when it is judged that the packet can be transmitted. A data processor makes a buffer memory store encoded data therein when it is confirmed that the storage request signal is effective. The data processor reads the encoded data from the buffer memory and transmits the read encoded data to a packet generator when it is confirmed that the storage request signal is ineffective and the encoded data is stored in the buffer memory. The data processor receives the encoded data from the encoder and transmits the received encoded data to the packet generator when it is confirmed that the storage request signal is ineffective and the encoded data is not stored in the buffer memory.

47 Claims, 9 Drawing Sheets

MOVING IMAGE COMMUNICATION DEVICE, MOVING IMAGE COMMUNICATION SYSTEM AND SEMICONDUCTOR INTEGRATED CIRCUIT USED FOR COMMUNICATION OF MOVING IMAGE

BACKGROUND OF THE INVENTION

1. Field of the Invention

The present invention relates to a moving image communication device and a moving image communication system connected to networks, such as the Internet and Intranet, directly or via a LAN cable so as to transmit moving image data to a client, and to a semiconductor integrated circuit used for the communication of the moving image data.

2. Description of the Related Art

In response to the advancement of moving image compression technology, a network camera system for delivering digital moving images via networks such as the Intranet and Internet has been developed, and an increasing number of such camera systems are being made commercially available. In the system of this type, a digital camera (provided with a moving image communication device) is connected to the network via the LAN or wireless LAN, and moving image data generated in the digital camera, which is addressed to a specific reproduction device, is transmitted to the network via the moving image communication device. Because a network whose reliability is low is used in the communication, data is packetized, and the arrival of the packet is monitored at the terminal of a communication path. If a packet is found not to have arrived yet, for example, the packet is re-transmitted. Thus, measures are taken in order to prevent the omission of any packet so as to guarantee that the data is identical before and after the transmission.

Moving image data is incessantly generated in real time in the moving image communication device, which makes it an indispensable issue to guarantee the real-time transmission. Otherwise, it becomes impossible to reproduce the moving image in the reproduction device. An effective way to guarantee the real-time transmission is to continue the transmission irrespective of any packet missing on the network, which, however, results in the failure to accurately reproduce the moving image data. As a result, the delivery of the moving image, which is the object of the network camera system, cannot be realized.

In order to solve the foregoing problem, a camera system of a network storage type, which is recited in the Unexamined Japanese Patent Publication No. 2003-18525, was proposed. In the system, packets are managed in a moving image data storage server provided on the network, and the moving image data storage server performs the communication with the moving image communication device so that any packet missing on the network is interpolated and stored. Accordingly, the packets are interpolated in a state where the network is established between the moving image communication device and the moving image data storage server (in a state where the communication is maintained). As a result, the real-time transmission can be realized without the loss of any packet.

The camera system of the network storage type, however, is still disadvantageous in that the data may be missing depending on the communication conditions. More specifically, the camera system of the network storage type fails to respond to the following cases:

1) the real-time transmission is not possible due to congestion in network bands; and 2) the network is physically shut down.

SUMMARY OF THE INVENTION

Therefore, a main object of the present invention is to transmit image data on the networks without the data omission.

In order to achieve the foregoing object, a moving image communication device according to the present invention comprises:

an encoder for generating encoded data from image data;

a packet generator for generating a packet from the encoded data and transmitting the generated packet to a network;

a communication processor for judging whether or not the packet can be transmitted by the packet generator based on communication conditions of the network and generating and transmitting a storage request signal in accordance with a result of the judgment;

a buffer memory in which the encoded data can be stored; and a data processor for judging a state where the encoded data is stored in the buffer memory in response to the storage request signal and controlling the encoded data based on a result of the judgment wherein the communication processor sets the storage request signal to be effective when it is judged that the packet cannot be transmitted and sets the storage request signal to be ineffective when it is judged that the packet can be transmitted, the data processor makes the buffer memory store the encoded data therein when it is confirmed that the storage request signal is effective;

the data processor reads the encoded data from the buffer memory and transmits the read encoded data to the packet generator when it is confirmed that the storage request signal is ineffective and the encoded data is stored in the buffer memory, and the data processor receives the encoded data from the encoder and transmits the received encoded data to the packet generator when it is confirmed that the storage request signal is ineffective and the encoded data is not stored in the buffer memory.

According to the present invention thus constituted, the communication processor judges from the communication conditions of the network if the packet can be transmitted. When the judgment result shows that the packet can be transmitted, the data processor causes the packet generator to generate the packet from the encoded data in the packet generator, and transmits the generated packet to the network. When the judgment result shows that the packet cannot be transmitted the data processor generates the storage request signal and transmits it to the data processor. The data processor receives the storage request signal, and correspondingly stores the encoded data in the buffer memory. Accordingly, the real-time transmission is interrupted; however, the encoded data is saved. When the network conditions showing the communication failure regains its communication availability, the communication processor detects the information and sends it to the data processor. Then, the data processor reads the encoded data stored in the buffer memory in order to transmit it. Thus, in the case where it is not possible to transmit the encoded data because the network is unfavorably congested, disconnected or the like, the encoded data is stored. Therefore, the stored encoded data can be transmitted to the party on the other end in the communication via the network after the recovery of the communication line. Then, the moving images during the disconnection can be checked later by the party on the other end (reproduction device or the like). In the case of the foregoing constitution, there is a need to allow for a situation in which the encoded data transmitted when the network is congested is inevitably more or less delayed from the real time.

The data processor preferably makes the encoder generate the encoded data in such a manner that a higher resolution than in an ordinary encoding operation is obtained when it is confirmed that the storage request signal is effective. Accordingly, the encoded data constituting clearer moving images can be saved in the buffer memory during a period over which a problem continues.

The data processor preferably makes the encoder generate the encoded data in such a manner that a lower resolution than in an ordinary encoding operation is obtained when it is confirmed that the storage request signal is effective. Accordingly, the moving image encoded data can be stored in the buffer memory for a long period of time during a period over which a problem continues.

The moving image communication device preferably further comprises a motion detector for detecting an image motion in the image data, wherein the data processor controls the storage of the encoded data in the buffer memory based on a result of the detection of the image motion by the motion detector when it is confirmed that the storage request signal is effective.

A plurality of frame data which are continuous timewise preferably constitute the image data, wherein the motion detector appends a motion detection flag to the respective frame data and sets the motion detection flag of the frame data in which the image motion is detected to be effective, and the data processor selectively stores the frame data in which the motion detection flag is effective in the buffer memory when it is confirmed that the storage request signal is effective. Accordingly, the encoded data can be efficiently stored in the buffer memory during a period of the storage in conjunction with the motion of the obtained image.

A plurality of frame data which are continuous timewise preferably constitute the image data, wherein the motion detector appends a motion detection flag to the respective frame data and sets the motion detection flag of the frame data in which the image motion is detected to be effective, and the data processor selectively stores a plurality of frame data before and after the frame data in which the motion detection flag is effective in the buffer memory when it is confirmed that the storage request signal is effective. Accordingly, the frame data with the core of the motion detection therebetween are stored, while any other frame data is deleted from the buffer memory. Therefore, the buffer memory can be efficiently used.

A plurality of frame data which are continuous timewise preferably constitute the image data, wherein the motion detector appends a motion detection flag to the respective frame data and sets the motion detection flag of the frame data in which the image motion is detected to be effective, and in the case where the motion detection flag of an arbitrary frame data and the motion detection flags of a plurality of frame data temporally preceding the arbitrary frame data, the number of which is previously set, are effective, the data processor selectively stores the arbitrary frame data and the plurality of frame data in the buffer memory.

Accordingly, the encoded data to be stored in the buffer memory can be limited to the frame data in which the image motion is detected and the plurality of frame data after the frame data.

The image processor preferably comprises a region management processor for dividing the image data into a plurality of small regions and managing the image data based on the respective regions, wherein the encoder generates the encoded data for each of the plurality of small regions, and the data processor controls the storage of the image data in the buffer memory for each of the plurality of small regions. Accordingly, the image data can be processed for each of the small regions, which contributes to the reduction of a capacity of the buffer memory.

In the foregoing constitution the encoder preferably generates the encoded data based on a compressibility ratio which differs in each of the plurality of small regions. Accordingly, a clear and sharp image can be stored when the compressibility ratio is set to be low, while an image having a motion which may be unclear but is easily recognizable can be stored when the compressibility ratio is set to be high.

The moving image communication device preferably further comprises a motion detector for detecting an image motion for each of the plurality of small regions obtained by the division of the image data, wherein the encoder generates the encoded data for each of the plurality of small regions and the data processor controls the storage of the encoded data in the buffer memory based on a result of the detection of the image motions. Further, the encoder may preferably selectively generate the encoded data of the small region in which the image motion is detected. Accordingly, the small regions and the motion detection are associated with each other, and the data of any small region where the motion is not detected is discarded, which further contributes to the reduction of the capacity of the buffer memory.

The data processor preferably controls an image quality correction parameter in the image processor in accordance with the status of the storage request signal. In the foregoing constitution, the data processor may preferably set a parameter for generating a monochromatic image as the image quality correction parameter when it is confirmed that the storage request signal is effective. Accordingly, the moving image data can be generated so that an improved image quality is obtained or a lower image quality is obtained during the storage period than in an ordinary transmission period.

The moving image communication device preferably further comprises a motion detector for detecting an image motion in the image data, wherein a plurality of frame data which are continuous timewise preferably constitute the image data, the motion detector appends a motion detection flag to each of the frame data and sets the motion detection flag of the frame data in which the image motion is detected to be effective, and the image processor sets a correction parameter for emphasizing an image of the frame data in which the motion detection flag is effective when it is confirmed that the storage request signal is effective.

Accordingly, the moving image stored during the interruption of the communication can be emphasized.

The data processor preferably adjusts a frame rate at which the encoded data is stored in the buffer memory when it is confirmed that the storage request signal is effective. Further, the data processor preferably sets the frame rate to be higher than a transmission frame rate in an ordinary communication when it is confirmed that the storage request signal is effective.

The data processor preferably makes the encoder generate the encode data in a different manner in comparison to the ordinary communication when it is confirmed that the storage request signal is effective. In the foregoing constitution, the moving image communication device may preferably further comprise an image processor for generating the image data, wherein the data processor makes the image processor generate the image data having an image size different to that of the image data in the ordinary communication when it is confirmed that the storage request signal is effective. Accordingly, the buffer memory can be efficiently used because the size of the moving image can be adjusted.

The communication processor preferably transmits and receives the storage request signal between itself and the party on the other end in the network communication, and transfers the received storage request signal to the data processor upon the reception of the storage request signal from the other party in the network communication irrespective of communication conditions in the network. Accordingly, in the case where, for example, a person of the party on the other end in charge of monitoring the image data in real time has to leave his/her operation room, the image data received while the person in charge is away is stored in the buffer memory when the storage request signal is transmitted through his/her operation. Therefore, the images during the storage period can be checked when the person is back. In this case, the check can be easier when these images are displayed along with the real-time moving images.

The communication processor preferably receives the storage request signal from the other party on the other end in the network communication without the generation of the storage request signal. In the foregoing constitution, the function of generating the storage request signal is omitted in the communication processor.

According to the foregoing constitution, when the communication processor receives the storage request signal from the other party in the network communication, the data processor transmits the encoded data of the moving image generated by the encoder to the packet generator and causes the packet generator to generate the packet, and then, transmits the generated packet to the network. In the case where the storage request signal is not received, the data processor stores the encoded data generated by the encoder in the buffer memory. Accordingly, the real-time transmission is interrupted; however, the encoded data is saved. When the storage request signal is received, the data processor reads the encoded data stored in the buffer memory in order to transmit it. In the case where a person of the party on the other end in the communication has to leave his/her operation room and he/she therefore transmits the storage request signal, the image data revived while he/she is away is stored in the buffer memory in the moving image communication device. Therefore, the person in charge can check the images during the storage period when he/she is back.

The moving image communication device according to the present invention preferably further comprises:
a lens for imaging a photographic subject;
an image input unit for converting an optical image obtained by the lens into an electrical signal and generating digital image data from the electrical signal; and
an image processor for generating the image data by correcting the digital image data.

The moving image communication device according to the present invention preferably further comprises:
an audio input device; and
an audio input unit for converting an audio signal outputted from the audio input device into digital audio data, and
an audio processor for signal-processing the audio data and transmitting the signal-processed data to the encoder, wherein
the encoder encodes the signal-processed audio data and the image data in synchronization with each other.

According to the present invention thus described, in the case where any abnormal situation, such as congestion or disconnection, arises in the network and the encoded data thereby cannot be transmitted, the encoded data is stored in the buffer memory, read from the buffer memory when the transmittable state is regained, and then transmitted to the network. Accordingly, the data loss, which may occur due to communication conditions, can be prevented, and the encoded data can be transmitted to the reproduction device in a manner suitable for the communication statuses. As a result, the moving images can be very accurately recorded and reproduced in the party on the other end in the communication (reproduction device or the like).

In the case where the moving image communication device is used for monitoring in the network where the reliability is low, the moving images can be continuously recorded and reproduced in such a manner that any suspicious person's image is not skipped. Further, the moving images can be transmitted in an effective manner in a television/television conference system which does not demand the real-time performance.

The technology according to the present invention, which is capable of realizing such a system that does not skip any moving image in an environment where an unreliable network is used, is useful as a network moving image communication device provided for monitoring or other purposes, and is also advantageously applicable to a network television telephone based on the same reason.

BRIEF DESCRIPTION OF THE DRAWINGS

These and other objects as well as advantages of the invention will become clear by the following description of preferred embodiments of the invention and be specified in the claims attached hereto. A number of benefits not recited in this specification will come to the attention of the skilled in the art upon the implementation of the present invention.

DETAILED DESCRIPTION OF THE INVENTION

Hereinafter, preferred embodiments of the present invention are described referring to the drawings.

Preferred Embodiment 1

Figure 1:
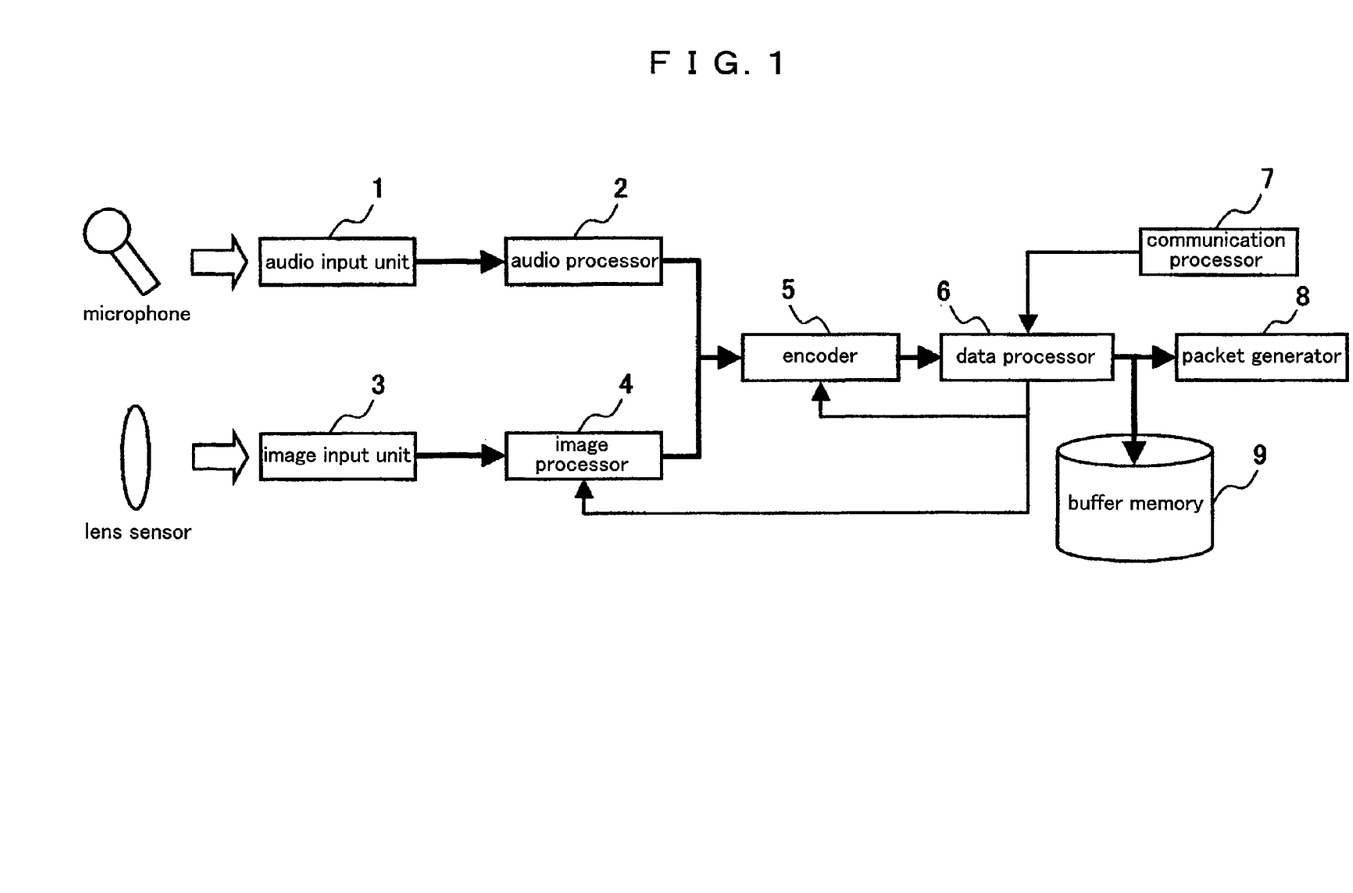
FIG. 1 is a block diagram illustrating a constitution of a moving image communication device according to a preferred embodiment 1 of the present invention.

FIG. 1 is a block diagram illustrating a constitution of a moving image communication device according to a preferred embodiment 1 of the present invention. The moving image communication device is provided in, for example, a semiconductor integrated circuit. Referring to reference numerals shown in FIG. 1, 1 denotes an audio input unit for converting an audio signal from an audio input device, such as a microphone, into digital audio data, 2 denotes an audio processor for signal-processing the audio data generated by the audio input unit 1, 3 denotes an image input unit for converting an optical image obtained by a lens for imaging a photographic subject into an electrical signal and converting the electrical signal into digital image data, 4 denotes an image processor for generating image data by correcting the digital image data generated by the image input unit 3, 5 denotes an encoder for synchronizing the audio data generated by the audio processor 2 and the image data generated by the image processor 4 and converting the synchronized data into encoded data having an arbitrary format, 6 denotes a data processor for managing a buffer memory 9 described later and storing/discarding the encoded data inputted from the encoder 5 in/from the buffer memory 9, 8 denotes a packet generator for generating a packet from the encoded data stored in the buffer memory 9 and the encoded data outputted from the encoder 5, and 9 denotes the buffer memory in which the encoded data generated by the encoder 5 is stored. 7 denotes a communication processor for controlling network bands, judging if the packet can be transmitted based on current communication conditions, and then transmitting a storage request signal to the data processor 6.

The communication processor 7 monitors the current conditions of the network, and generates the storage request signal when it is judged that the image data cannot be transmitted, and then, transmits the generated signal to the data processor 6. The data processor 6 receives the encoded data generated by the encoder 5 and controls a data flow of the encoded data depending on whether or not the storage request signal is transmitted from the communication processor 7. More specifically, the data processor 6 sends an instruction to packetize the encoded data to the packet generator 8 in the case where the storage request signal is not received, while causing the encoded data to be stored in the buffer memory 9 in the case where the storage request signal is received. As a result of the cooperative operations between the communication processor 7 and the data processor 9, the management of the encoded data is performed in accordance with the network conditions.

The data processor 6 arbitrarily controls an encoding parameter in the encoder 5 and an image quality correction parameter in the image processor 4. When a failure in the connection between the moving image communication device or the communication conditions in the network arises, the data processor 6 receives a storage request signal from the communication processor 7. The data processor 7 which has received the storage request signal has first and second operation modes described below.

In the first operation mode, the data processor 6 sets a parameter suitable for generating moving image data in such a manner that a clearer image quality is obtained during a storage period than in an ordinarily transmission period. In the second operation mode, the data processor 6 sets a parameter suitable for the generation of the moving image with a lower image quality during the storage period. In the first operation mode (clear image quality mode), the encoded data can be stored in the buffer memory 9 in such a manner that the image quality is higher than that in the ordinary transmission period. In other words, the obtained image data can be stored in clear image conditions during a period over which a problem continues. In the second operation mode (low image quality mode), the obtained image data can be stored in the buffer memory 9 for a long period of time during the period over which a problem continues.

As described, the moving image communication device according to the present preferred embodiment is advantageously used for a monitor camera and the like. The selection of the clear-image recording or the long-hour recording can be decided when a problem is arises depending on intended purposes.

The buffer memory 9 is not limited to an internal memory inside the main body of the moving image communication device, in place of which an external memory, such as a SD memory card, may be used.

In the moving image communication device according to the present preferred embodiment, the buffer memory 9 is incorporated therein (or an external memory such as an SD memory card which is connected thereto is used), and a memory capacity thereof is accordingly limited to a certain volume. In other words, it is necessary for the image data to be efficiently stored in the buffer memory 9 in order to respond to the disconnection which may last in a long period of time, and a data size controlled by the data processor 6 when the data is stored is consequently reduced. In the moving image communication device according to the present preferred embodiment, therefore, the data processor 6 controls the parameters in the image processor 4 and the encoder 5 during the storage period. Accordingly, the encoded data generated during the storage period can be arbitrarily changed. More specifically, such a control operation that a parameter for generating a monochromatic image is set in the image processor 4 for the image data during the storage period is implemented, so that:

a data volume of the generated image data is reduced; and the image data whose image quality is low is generated through the adjustment of the encoding parameter so that the encoded data is reduced.

As a result, the data size of the encoded data stored in the buffer memory 9 can be reduced.

Figure 2:
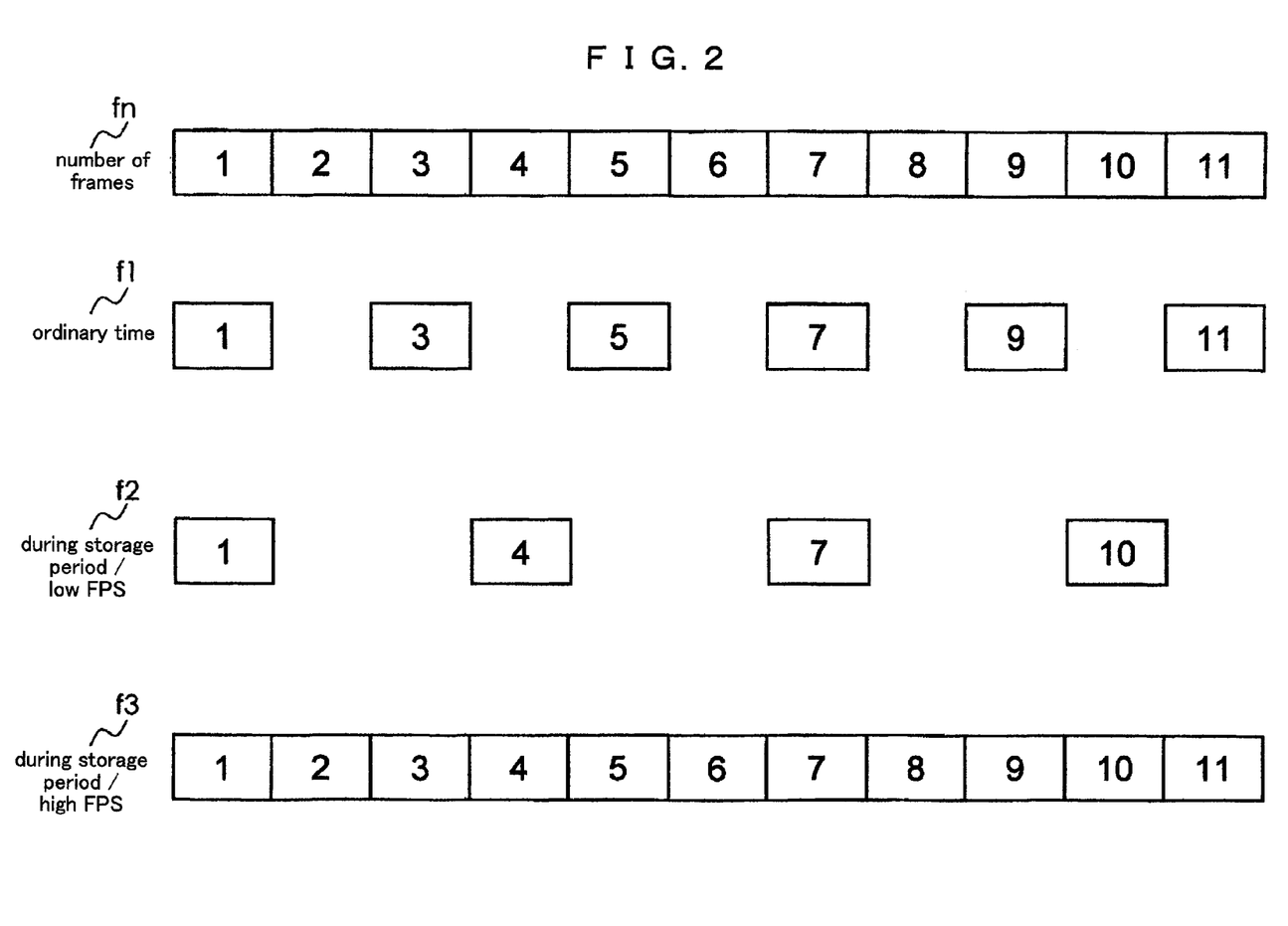
FIG. 2 is an illustration of a frame rate in preferred embodiments of the present invention.

FIG. 2 shows a frame rate control operation in the moving image communication device according to the present preferred embodiment. When an image during the storage period is analyzed, the image during the storage period desirably has a high frame rate. In the present preferred embodiment wherein the capacity of the buffer memory 9 is limited, however, the encoded data should be efficiently stored in the moving image communication device according to the present preferred embodiment. In the present preferred embodiment, the encoding process by the encoder 5 is controlled by the data processor 6 when the data storage is requested. Then, the data is encoded with an arbitrary frame rate and the encoded data thereby obtained is stored in the buffer memory 9. At the time, the encoded data can be stored with a frame rate which is higher than that of the ordinary communication or a frame rate which is lower than that. The frame rate applied during the storage period can be arbitrarily controlled, which allows the data to be effectively stored based on the conditions of the storage period.

In the case where there are fn fram number of frame data (encoded data), the moving image is generated with a frame rate in an ordinary time (f1) during an ordinary communication period. However, any of the following data storage methods can be selected during the storage period:

the frame data is stored with a frame rate f2 which is lower than in the ordinary time;

the frame data is stored with a frame rate f3 which is higher than in the ordinary time; and the frame data is stored with a frame rate f4 which is equal to that of the ordinary time.

The frame rates in the ordinary period and the storage period can be arbitrarily changed, respectively, and are not limited to those shown in FIG. 2.

Figure 3:
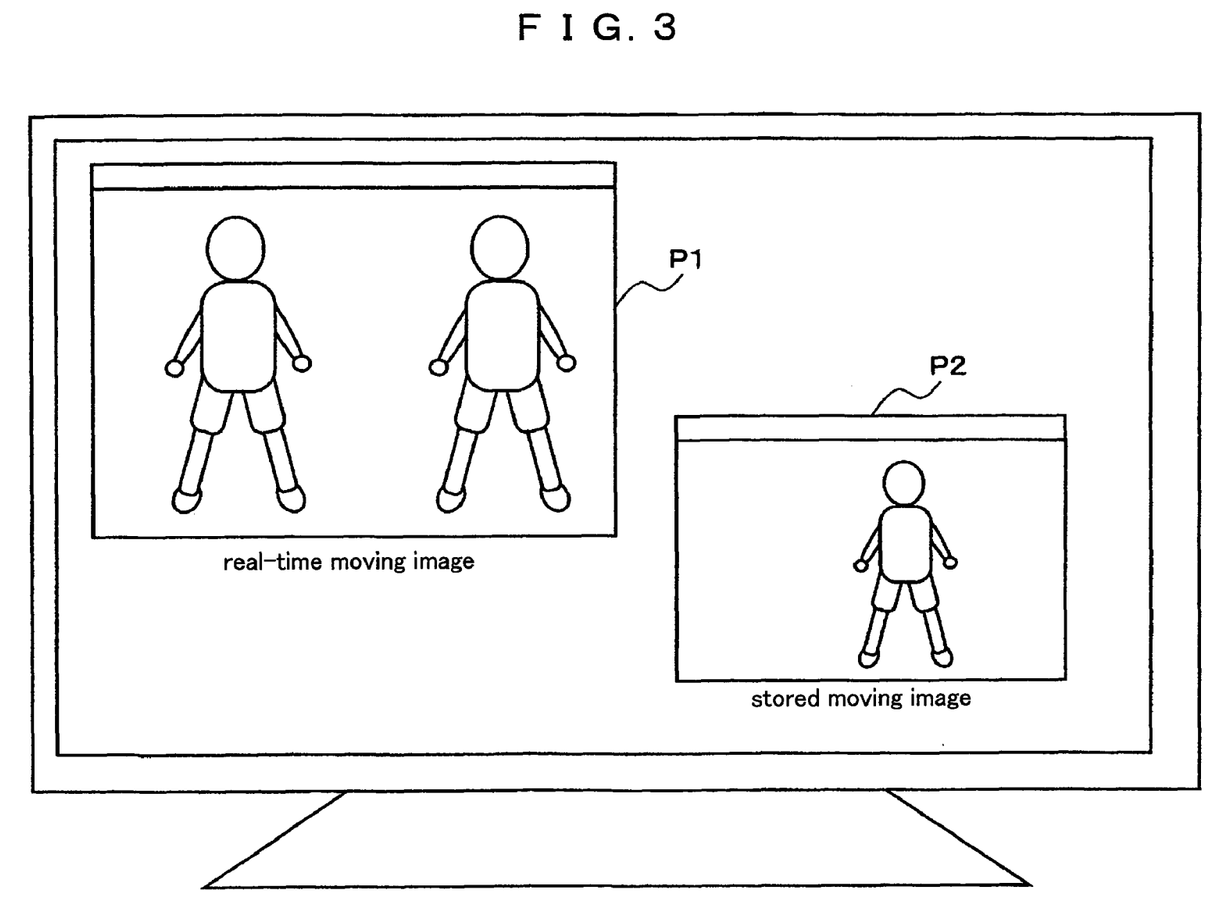
FIG. 3 shows a display screen in a reproduction device according to the preferred embodiment 1.

FIG. 3 shows a reproduction image of the moving image transmitted via the network in the moving image communication device according to the present preferred embodiment. P1 is a real-time moving image which is reproduced from a moving image generated and transmitted in real time by a moving image communication device, and P2 is a stored moving image which is reproduced from a stored moving image stored in the buffer memory 9 due to a failure arising in the network.

In the case where the connection is cut off due to some factor and the communication is recovered in the moving image communication device, it is desirable that not only the moving images during the storage period but also the moving images in real time be displayed at the same time in the reproduction device. In the moving image communication device according to the present preferred embodiment, the moving image data during the storage period can be image-processed and encoded as continuous moving image data separately from the real-time moving image data during the ordinary communication period, and, therefore, managed as different moving image data. Accordingly, the real-time moving image data and the stored moving image data can be transmitted in the same series and simultaneously reproduced in the reproduction device.

Further, when the real-time moving image data in the ordinary communication and the stored moving image data during the storage period are respectively managed as different continuous moving image data, the size of the real-time moving image and the size of the stored moving image size can be set to dimensions different to each other. More specifically, the stored moving image data can be stored in the buffer memory 9 in a size smaller than that of the real-time moving image data and then transmitted to the reproduction device after the communication is recovered. Accordingly, the region of the buffer memory 9 can be economically used, and the size of the moving image transmitted when the communication is recovered can be reduced. As a result, the communication traffic can be effectively utilized.

Figure 4:
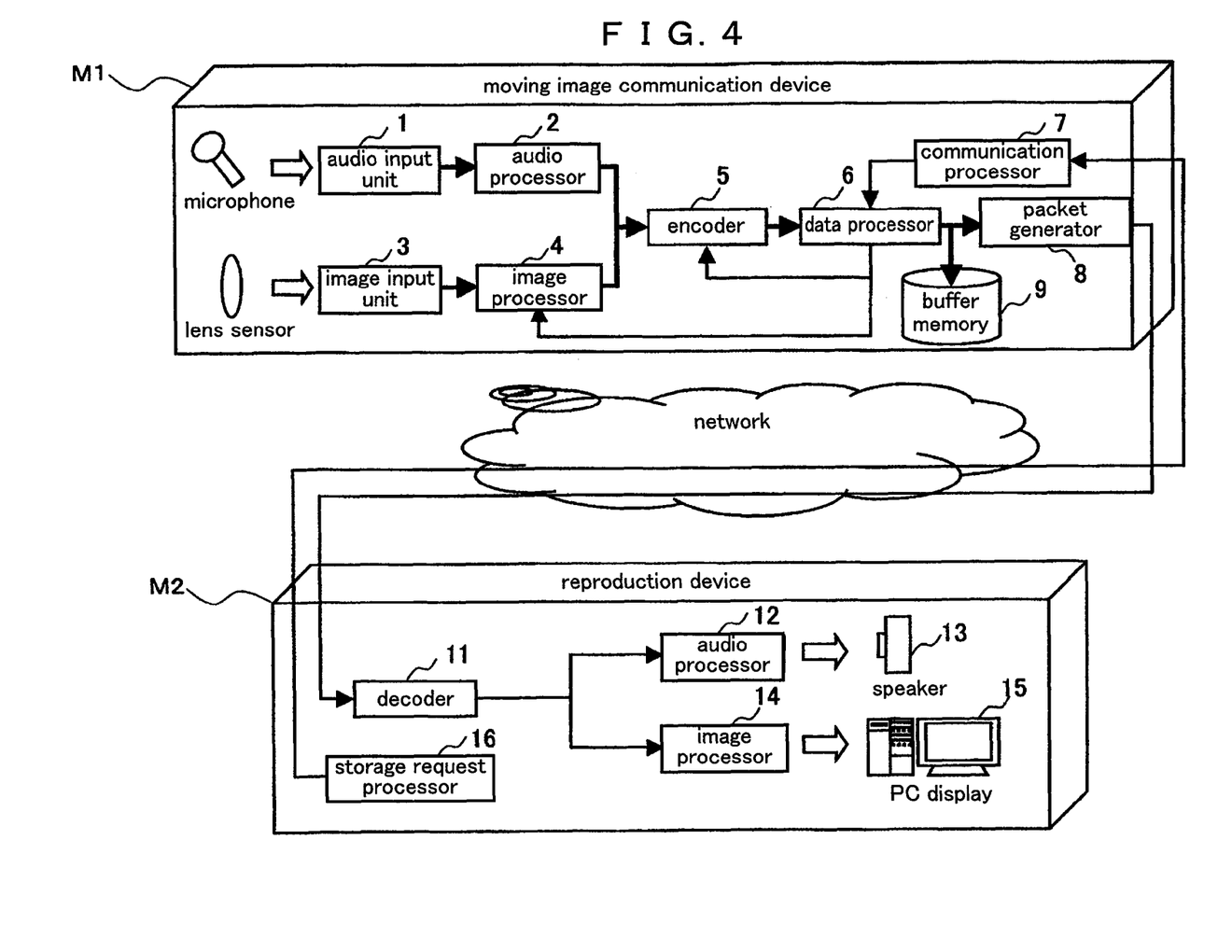
FIG. 4 is a block diagram illustrating the constitutions of the moving image communication device and the reproduction device according to the preferred embodiment 1.

FIG. 4 shows the constitutions of the moving image communication device and the reproduction device according to the present preferred embodiment, that is a moving image communication system. 11 denotes a decoder, 12 denotes an audio processor, 13 denotes a speaker, 14 denotes an image processor, 15 denotes a display unit, and 16 denotes a storage request processor.

When the storage request signal is transmitted to a moving image communication device M1 based on an operation of the storage request processor 16 by a user of a reproduction device M2, the moving image communication device M1 which received the storage request signal stores the encoded data of the real-time moving image in the buffer memory 9. Accordingly, a data storage timing can be dynamically controlled in the reproduction device M2.

When a person in charge of monitoring the reproduction device M2 in real time has to leave his/her operation room, for example, he/she operates the storage request processor 16 so that the images obtained while he/she is away can be stored in the moving image communication device M1. As a result, the moving images during the storage period and the real-time moving images can be checked at the same time after the person is back. The buffer memory 9 of the moving image communication device M1 may be a recording medium externally provided such as an SD card.

When the communication processor 7 receives the storage request signal from the reproduction device M2 in a state where the network conditions are monitored by the communication processor 7 and the storage/discard of the encoded data is controlled by the data processor 6 based on the storage request signal in the moving image communication device M1, the data processor 6 ignores any internal processing of the moving image communication device M1 and stores the encoded data. Thus, the data storage can be dynamically controlled by the data processor 6 based on the storage request signal transmitted from the reproduction device M2.

Preferred Embodiment 2

Figure 5:
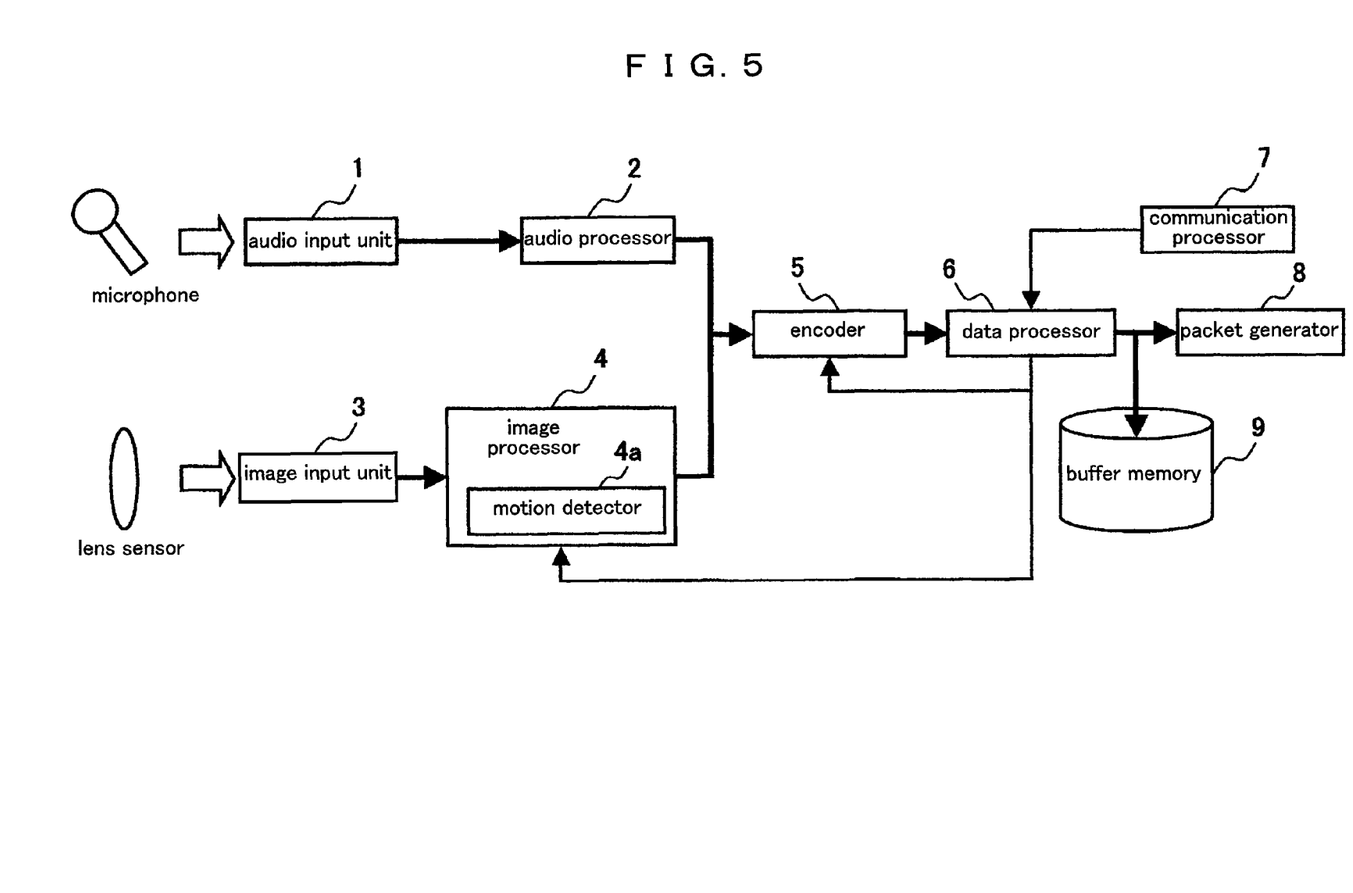
FIG. 5 is a block diagram illustrating a constitution of a moving image communication device according to a preferred embodiment 2 of the present invention.

FIG. 5 is a block diagram illustrating a constitution of a moving image communication device according to a preferred embodiment 2 of the present invention. In the moving image communication device according to the present preferred embodiment, a motion detector 4a for expanding the function of the image processor 4 is further provided in the constitution of the moving image communication device according to the preferred embodiment 1 (constitution of the moving image communication device shown in FIG. 1). The motion detector 4a detects an image motion in the image data generated by the image processor 4. Further, the motion detector 4a appends a motion detection flag to all of the frame data, and selectively sets the motion detection flag of the frame data in which the motion is detected to be effective. Accordingly, the storage of the encoded data (frame data) in the buffer memory 9 during the storage period can be efficiently performed in conjunction with the motion of the obtained image. Frame data is a unit of a plurality of image data which are continuous timewise, and the frame data constitutes the image data.

Figure 6:
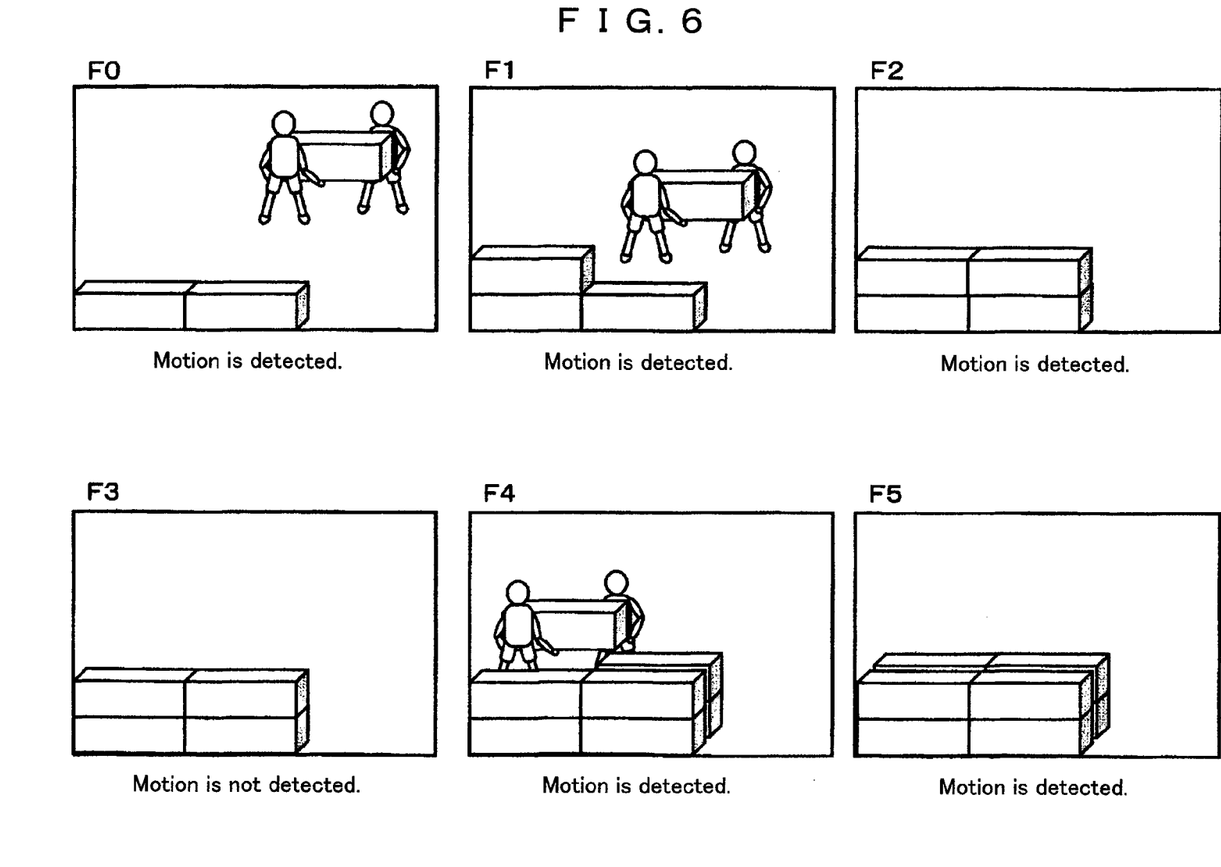
FIG. 6 is an illustration of image processing according to the preferred embodiment 2.

FIG. 6 shows an example of the motion detection in continuous moving images. Frame data F0-F5 are continuous frame data, and the motion is detected in each of them based on a difference relative to the previous frame data. Then, the motion detection flag is set to be effective or ineffective. In the frame data F0, F1, F2, F4 and F5, wherein the difference relative to the previous frame data is present, are judged to be the frame data where the motion is detected. Therefore, the motion detection flags of these frame data are set to be effective. The frame data F3 which lacks any difference relative to the previous frame data F2 is, however, judged to be the frame data in which the motion is not detected, and the motion detection flag of the frame data is set to be ineffective. Below are described how the frame data in which the motion detection flag is set to be effective (hereinafter referred to as flag-effective frame data) and the frame data in which the motion detection flag is set to be ineffective (hereinafter, referred to as flag-ineffective frame data) are processed.

The data processor 6, upon the reception of the storage request signal from the communication processor 7, sends out an encoding request signal, a storage-period setting signal, an encoding parameter control signal and an encoding mode control signal to the encoder 5. The encoder 5, upon the reception of the encoding request signal from the data processor 6, encodes the frame data. The encoding request signal includes information for designating an encoding mode. The data processor 6 controls the frame data to be encoded based on the encoding mode designated in the encoding request signal.

The types of the encoding modes include the following:

mode for selectively encoding the flag-effective frame data;

mode for selectively encoding k (k is an arbitrary natural number) number of frame data subsequent to the flag-effective frame data through the management of the past motion detection flags; and mode for encoding all of the frame data irrespective of whether or not the motion is detected.

The data processor 6 indicates the encoding mode to the encoder 5. The encoder 5 controls an encoding timing in accordance with the indicated encoding mode during the storage period. The encoder 5 checks the motion detection flag appended to the frame data supplied from the image processor 4 to thereby distinctly identifies the frame data to be encoded and the frame data for which the encoding process is cancelled. When the motion detection flag is effective the frame data in which the motion is detected is selectively encoded; however, the encoding process is omitted for any frame data in which the motion is not detected.

The motion detection flag is utilized not only in the encoder 5 but also in the data processor 6. The data processor 6 controls the frame data stored in the buffer memory 9 (storage frame data) based on the motion detection flag. The control of the frame data has the following patterns:

a) The data processor 6 judges the status of the motion detection flag appended to the frame data inputted from the encoder 5, and selectively stores the flag-effective frame data in the buffer memory 9i while discarding the flag-ineffective frame data. Thus, the frame data in which the motion in the continuous moving images is detected during the storage period is selectively stored. After the communication conditions of the network are recovered, the stored frame data is read from the buffer memory 9 and transmitted to the reproduction device via the network. As a result, only the frame data in which the motion is detected in the continuous moving images during the storage period is reproduced as the moving images in the reproduction device.

b) The data processor 6 stores the frame data of all frames supplied from the encoder 5 in the buffer memory 9. Then, the data processor 6 sequentially discards any frame data among the stored frame data other than the frame data in which the motion detection flag is set to be effective (motion-detected frame data), m number of frame data temporally preceding the motion-detected frame data and n number of frame data temporally subsequent to the motion-detected frame data (m and n are arbitrary natural numbers). Thus constituted, a plurality of frame data before and after the frame data in which the motion is detected in the continuous moving images during the storage period can be selectively stored in the buffer memory 9. As a result, the moving images, which are limited to the frame data in which the motion is detected, the m number of frame data before the motion-detected frame data and the n number of frame data after the frame data in which the motion in the continuous moving images is detected during the storage period, can be reproduced in the reproduction device.

c) In the case where k (k is an arbitrary natural number) number of frame data temporally preceding the current frame data includes the flag-effective frame data, the k number of frame data are selectively stored in the buffer memory 9. Accordingly, the flag-effective frame data and the k number of frame data thereafter timewise can be limitedly stored. As a result, the moving images, which are limited to the flag-effective frame data and the k number of frame data thereafter among the continuous moving images during the storage period, can be reproduced in the reproduction device.

d) In the case where all of the frame data during the storage period are stored, all of the images during the storage period can be transmitted after the recovery of the communication conditions.

As described, according to the present preferred embodiment, the encoder 5 and the data processor 6 control the processing of the inputted images in real time based on the motion detection flag appended by the motion detector 4a to thereby efficiently store the frame data during the storage period in the buffer memory 9. Therefore, in a network monitoring camera or the like, the images can be efficiently stored while the images during the connection failure are prevented from missing, and the images during the storage period can be reproduced in the reproduction device after the recovery of the network environment.

The data processor 6 controls the parameters of the image processor 4 and the encoder 5 during the storage period based on the contents of the motion detection flag appended by the image processor 4, and sets the encoding parameter of the motion-detected frame data (flag-effective frame data) to a low compression ratio during the storage period. As a result, the frame data which constitutes a clear and sharp image can be stored. When the encoding parameter of the frame data in which the motion is not detected (flag-ineffective frame data) is set to a high compression ratio, the motion-detected frame data can produce an image which may be unclear but is easily recognizable when reproduced by the reproduction device.

In a similar manner, the data processor 6 sets the parameter for the motion-detected frame data (flag-effective frame data) in the image processor 4 to a high image quality, while setting the parameter for the frame data in which the motion is not detected (flag-ineffective frame data) so that only a monochromatic image and an edge component are extracted. As a result, the motion-detected frame data (flag-effective frame data) can be displayed in an easily recognizable manner when reproduced by the reproduction device.

Preferred Embodiment 3

Figure 7:
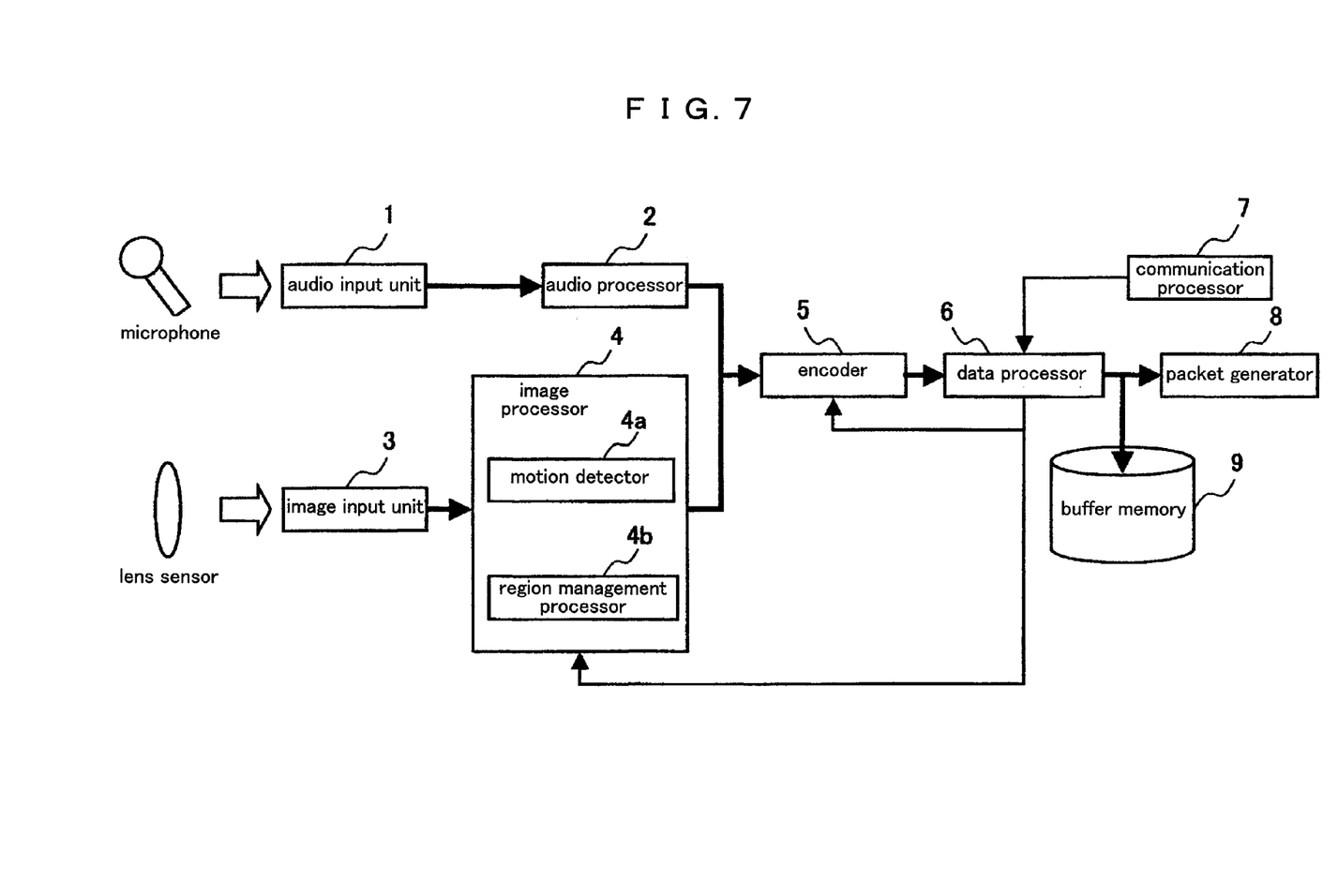
FIG. 7 is a block diagram illustrating a constitution of a moving image communication device according to a preferred embodiment 3 of the present invention.

FIG. 7 is a block diagram illustrating a constitution of a moving image communication device according to a preferred embodiment 3 of the present invention. In the moving image communication device according to the present preferred embodiment, a region management processor 4b for further expanding the function of the image processor 4 is further provided in the constitution of the moving image communication device according to the preferred embodiment 2 (constitution of the moving image communication device shown in FIG. 5). The region management processor 4b divides the image data generated by the image input unit 3 into a plurality of ("a" number of) small regions and manage them respectively.

Figure 8:
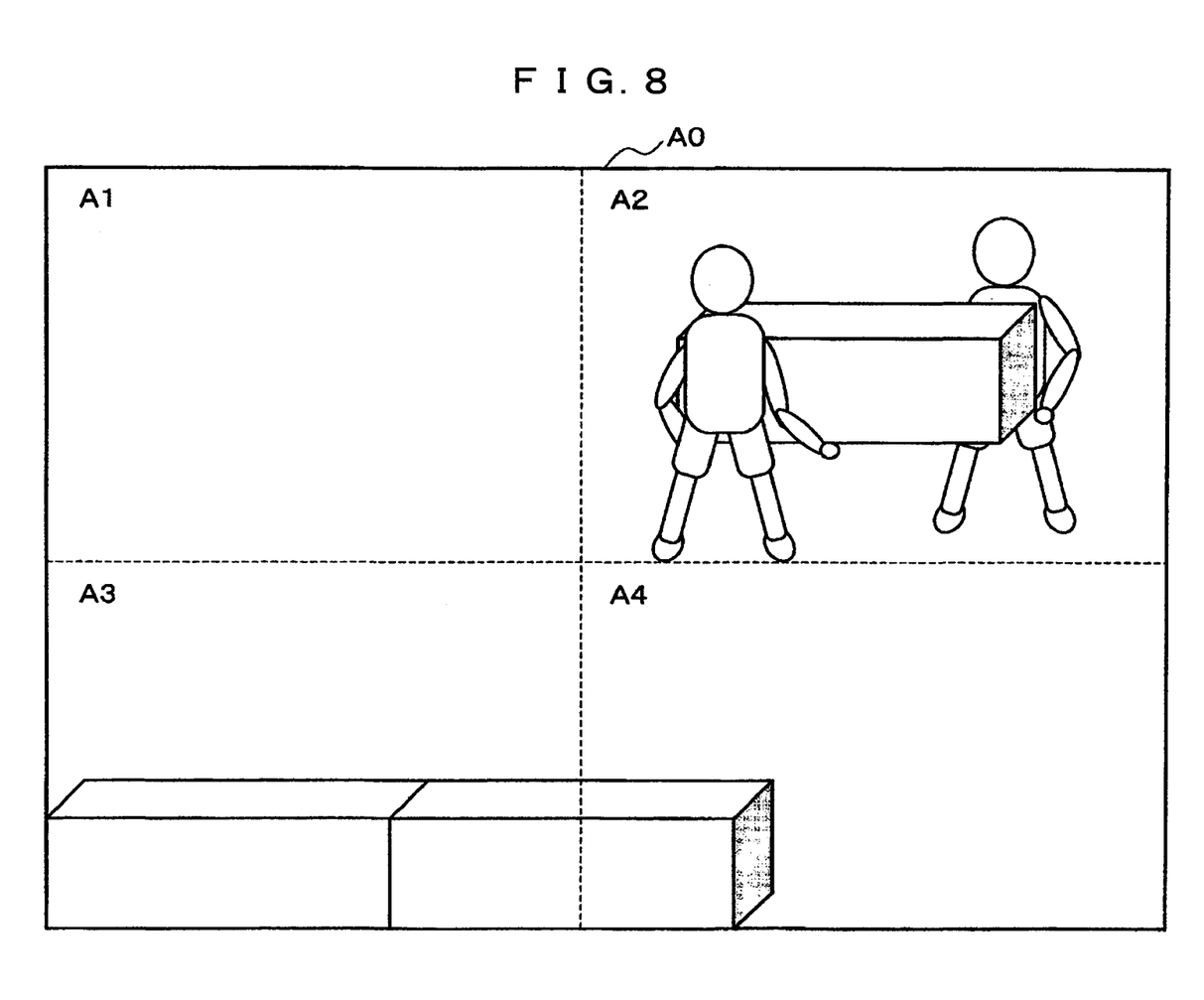
FIG. 8 is an illustration of region division by an image processor according to the preferred embodiment 3.

FIG. 8 shows a specific example of the management of the divided regions by the region management processor 4b. An entire screen A0 of the image data is divided into four small regions A1, A2, A3 and A4. The small regions A1, A2, A3 and A4 are each adapted in such a manner that a relative positional relationship relative to a pixel starting position of the frame data is recognized based on coordinate position information relating to the entire screen A0. This is an example of the basic method of dividing the image data into small regions. The value of the number of the divided regions a, how the small regions are recognized, and how the respective small regions are managed may be arbitrarily changed.

Figure 9:
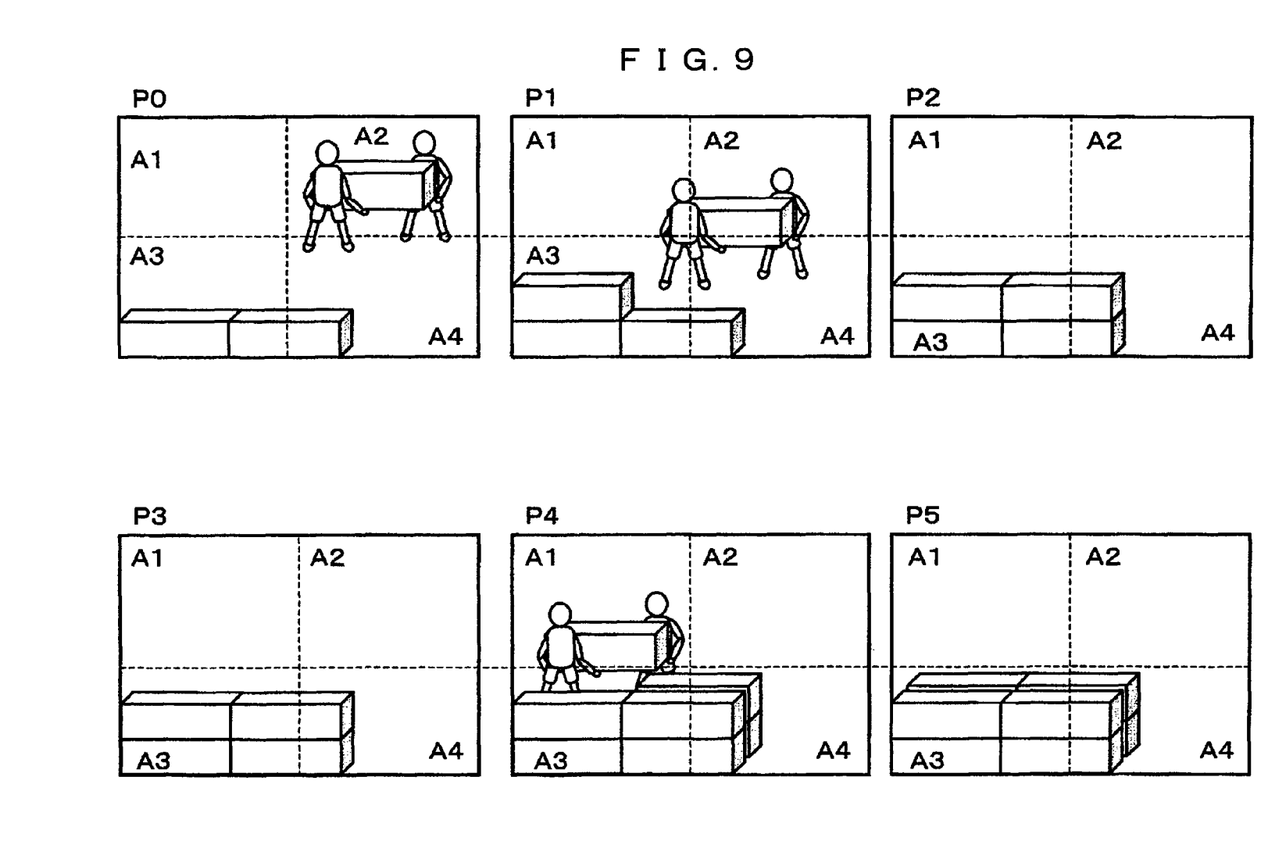
FIG. 9 is an illustration of region division by the image processor according to the preferred embodiment 3.

FIG. 9 shows an example of the management of the continuous moving image data based on the divided small regions A1-A4. The region management processor 4b divides continuous moving images (frame data) P0, P1, P2, P3, P4 and P5 into the respective small regions A1-A4, and the encoder 5 and the data processor 6 manages the image data for each of the small regions.

The encoder 5 corrects the encoding process and the encoding parameter for each of the small regions of the moving images and handles the respective small regions as the different image data. Further, the data processor 6 can effectively perform the data management during the storage period for each of the small regions by managing the storage/discard of the encoded data with respect to the buffer memory 9 for each of the small regions.

The motion processor 4 detects the motion in each of the small regions of the continuous moving images, and separately appends the motion-detection flag to each of the small regions based on a result of the detection. Accordingly, the encoder 5 can selectively encode the small region in which the motion detection flag is set to be effective (hereinafter, referred to as flag-effective small region) based on the motion detection flag. The data processor 6 stores/discards the frame data in/from the buffer memory 9 based on the flag-effective small region, and can thereby selectively stores the flag-effective small region of the frame data in which the motion is detected. Further, the data processor 6 sequentially discards any frame data from the buffer memory 9 other than m number of frame data temporally preceding the frame data including the flag-effective small region and n number of frame data temporally thereafter (m and n are arbitrary natural numbers), and can thereby selectively store the flag-effective small region of the frame data in which the motion is detected. The constitution described above requires a reproduction device capable of decoding the moving images for each of the small regions.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A moving image communication device comprising:
an encoder for generating encoded data from image data;
a packet generator for generating a packet from the encoded data and transmitting the generated packet to a network;
a communication processor for judging whether or not the packet can be transmitted by the packet generator based on communication conditions of the network and generating and transmitting a storage request signal in accordance with a result of the judgment;
a buffer memory in which the encoded data can be stored; and
a data processor for judging a state where the encoded data is stored in the buffer memory in response to the storage request signal and controlling the encoded data based on a result of the judgment, wherein
the communication processor sets the storage request signal to be effective when the communication processor judges that the packet cannot be transmitted and sets the storage request signal to be ineffective when the communication processor judges that the packet can be transmitted,
the data processor makes the buffer memory store the encoded data therein when the storage request signal is effective,
the data processor reads the encoded data from the buffer memory and transmits the read encoded data to the packet generator when the storage request signal is ineffective and the encoded data is stored in the buffer memory,
the data processor receives the encoded data from the encoder and transmits the received encoded data to the packet generator when the storage request signal is ineffective and the encoded data is not stored in the buffer memory, and
the data processor adjusts a frame rate at which the encoded data is stored in the buffer memory when the storage request signal is effective.

2. The moving image communication device as claimed in claim 1,
wherein the data processor makes the encoder generate the encoded data in such a manner that a higher resolution than in an ordinary encoding operation is obtained when the storage request signal is effective.

3. The moving image communication device as claimed in claim 1, wherein the data processor makes the encoder generate the encoded data in such a manner that a lower resolution than in an ordinary encoding operation is obtained when the storage request signal is effective.

4. The moving image communication device as claimed in claim 1, further comprising a motion detector for detecting an image motion in the image data, wherein
the data processor controls the storage of the encoded data in the buffer memory based on a result of the detection of the image motion by the motion detector when the storage request signal is effective.

5. The moving image communication device as claimed in claim 4, wherein
a plurality of frame data which are continuous timewise constitute the image data, wherein
the motion detector appends a motion detection flag to the respective frame data and sets the motion detection flag of the frame data in which the image motion is detected to be effective, and
the data processor selectively stores the frame data in which the motion detection flag is effective in the buffer memory when the storage request signal is effective.

6. The moving image communication device as claimed in claim 4, wherein
a plurality of frame data which are continuous timewise constitute the image data, wherein
the motion detector appends a motion detection flag to the respective frame data and sets the motion detection flag of the frame data in which the image motion is detected to be effective, and
the data processor selectively stores a plurality of frame data before and after the frame data in which the motion detection flag is effective in the buffer memory when the storage request signal is effective.

7. The moving image communication device as claimed in claim 4, wherein
a plurality of frame data which are continuous timewise constitute the image data, wherein
the motion detector appends a motion detection flag to the respective frame data and sets the motion detection flag of the frame data in which the image motion is detected to be effective, and
in the case where the motion detection flag of an arbitrary frame data and the motion detection flags of a plurality of frame data temporally preceding the arbitrary frame data, the number of which is previously set, are effective, the data processor selectively stores the arbitrary frame data and the plurality of frame data in the buffer memory.

8. The moving image communication device as claimed in claim 1, further comprising an image processor for generating the image data, wherein
the image processor comprises a region management processor for dividing the image data into a plurality of small regions and managing the image data based on the respective regions, wherein
the encoder generates the encoded data for each of the plurality of small regions, and
the data processor controls the storage of the image data in the buffer memory for each of the plurality of small regions.

9. The moving image communication device as claimed in claim 8, wherein the encoder generates the encoded data based on a compressibility ratio which differs in each of the plurality of small regions.

10. The moving image communication device as claimed in claim 1, further comprising a motion detector for detecting an image motion for each of a plurality of small regions obtained by dividing the image data, wherein
the encoder generates the encoded data for each of the plurality of small regions, and
the data processor controls the storage of the encoded data in the buffer memory based on a result of the detection of the image motions.

11. The moving image communication device as claimed in claim 10, wherein the encoder selectively generates the encoded data of the small region in which the image motion is detected.

12. The moving image communication device as claimed in claim 1, wherein the data processor controls an image quality correction parameter in accordance with the status of the storage request signal.

13. The moving image communication device as claimed in claim 12, wherein the data processor sets a parameter for generating a monochromatic image as the image quality correction parameter when the storage request signal is effective.

14. The moving image communication device as claimed in claim 1, further comprising an image processor for generating the image data, wherein the image processor comprises a motion detector for detecting an image motion in the image data, wherein
a plurality of frame data which are continuous timewise constitute the image data,
the motion detector appends a motion detection flag to each of the frame data and sets the motion detection flag of the frame data in which the image motion is detected to be effective, and
the image processor sets a correction parameter for emphasizing an image of the frame data in which the motion detection flag is effective when the storage request signal is effective.

15. The moving image communication device as claimed in claim 1, wherein the data processor sets the frame rate to be higher than a transmission frame rate in an ordinary communication when the storage request signal is effective.

16. The moving image communication device as claimed in claim 1, wherein the data processor makes the encoder generate the encode data in a different manner in comparison to an ordinary communication when the storage request signal is effective.

17. The moving image communication device as claimed in claim 16, further comprising an image processor for generating the image data, wherein
the data processor makes the image processor generate the image data having an image size different to that of the image data in the ordinary communication when the storage request signal is effective.

18. The moving image communication device as claimed in claim 1, wherein the communication processor transmits and receives the storage request signal between the communication processor and the party on the other end in the network communication, and transfers the received storage request signal to the data processor upon the reception of the storage request signal from the other party in the network communication irrespective of communication conditions in the network.

19. The moving image communication device as claimed in claim 1, wherein
the communication processor receives the storage request signal from the party on the other end in the network communication without the generation of the storage request signal.

20. The moving image communication device as claimed in claim 1, further comprising:
a lens for imaging a photographic subject;
an image input unit for converting an optical image obtained by the lens into an electrical signal and generating digital image data from the electrical signal; and
an image processor for generating the image data by correcting the digital image data.

21. The moving image communication device as claimed in claim 1, further comprising:
an audio input device; and
an audio input unit for converting an audio signal outputted from the audio input device into digital audio data, and
an audio processor for signal-processing the audio data and transmitting the signal-processed data to the encoder, wherein
the encoder encodes the signal-processed audio data and the image data in synchronization with each other.

22. A moving image communication system comprising:
the moving image communication device as claimed in claim 1; and
a reproduction device for receiving the packet delivered by the moving image communication device, wherein
the reproduction device comprises a decoder for decoding the received packet.

23. A semiconductor integrated circuit for communicating a moving image provided with the moving image communication device as claimed in claim 1.

24. A moving image communication device comprising:
an encoder for generating encoded data from image data;
a packet generator for generating a packet from the encoded data and transmitting the generated packet to a network;
a communication processor for judging whether or not the packet can be transmitted by the packet generator based on communication conditions of the network and generating and transmitting a storage request signal in accordance with a result of the judgment;

a buffer memory in which the encoded data can be stored; and a data processor for judging a state where the encoded data is stored in the buffer memory in response to the storage request signal and controlling the encoded data based on a result of the judgment, wherein the communication processor sets the storage request signal to be effective when the communication processor judges that the packet cannot be transmitted and sets the storage request signal to be ineffective when the communication processor judges that the packet can be transmitted, the data processor makes the buffer memory store the encoded data therein when the storage request signal is effective, the data processor reads the encoded data from the buffer memory and transmits the read encoded data to the packet generator when the storage request signal is ineffective and the encoded data is stored in the buffer memory, the data processor receives the encoded data from the encoder and transmits the received encoded data to the packet generator when the storage request signal is ineffective and the encoded data is not stored in the buffer memory, and the data processor makes the encoder generate the encode data in a different manner in comparison to an ordinary communication when the storage request signal is effective.

25. The moving image communication device as claimed in claim 24, wherein the data processor makes the encoder generate the encoded data in such a manner that a higher resolution than in an ordinary encoding operation is obtained when the storage request signal is effective.

26. The moving image communication device as claimed in claim 24, wherein the data processor makes the encoder generate the encoded data in such a manner that a lower resolution than in an ordinary encoding operation is obtained when the storage request signal is effective.

27. The moving image communication device as claimed in claim 24, further comprising a motion detector for detecting an image motion in the image data, wherein the data processor controls the storage of the encoded data in the buffer memory based on a result of the detection of the image motion by the motion detector when the storage request signal is effective.

28. The moving image communication device as claimed in claim 27, wherein a plurality of frame data which are continuous timewise constitute the image data, wherein the motion detector appends a motion detection flag to the respective frame data and sets the motion detection flag of the frame data in which the image motion is detected to be effective, and the data processor selectively stores the frame data in which the motion detection flag is effective in the buffer memory when the storage request signal is effective.

29. The moving image communication device as claimed in claim 27, wherein a plurality of frame data which are continuous timewise constitute the image data, wherein the motion detector appends a motion detection flag to the respective frame data and sets the motion detection flag of the frame data in which the image motion is detected to be effective, and the data processor selectively stores a plurality of frame data before and after the frame data in which the motion detection flag is effective in the buffer memory when the storage request signal is effective.

30. The moving image communication device as claimed in claim 27, wherein a plurality of frame data which are continuous timewise constitute the image data, wherein the motion detector appends a motion detection flag to the respective frame data and sets the motion detection flag of the frame data in which the image motion is detected to be effective, and in the case where the motion detection flag of an arbitrary frame data and the motion detection flags of a plurality of frame data temporally preceding the arbitrary frame data, the number of which is previously set, are effective, the data processor selectively stores the arbitrary frame data and the plurality of frame data in the buffer memory.

31. The moving image communication device as claimed in claim 24, further comprising an image processor for generating the image data, wherein the image processor comprises a region management processor for dividing the image data into a plurality of small regions and managing the image data based on the respective regions, wherein the encoder generates the encoded data for each of the plurality of small regions, and the data processor controls the storage of the image data in the buffer memory for each of the plurality of small regions.

32. The moving image communication device as claimed in claim 31, wherein the encoder generates the encoded data based on a compressibility ratio which differs in each of the plurality of small regions.

33. The moving image communication device as claimed in claim 24, further comprising a motion detector for detecting an image motion for each of a plurality of small regions obtained by dividing the image data, wherein the encoder generates the encoded data for each of the plurality of small regions, and the data processor controls the storage of the encoded data in the buffer memory based on a result of the detection of the image motions.

34. The moving image communication device as claimed in claim 33, wherein the encoder selectively generates the encoded data of the small region in which the image motion is detected.

35. The moving image communication device as claimed in claim 24, wherein the data processor controls an image quality correction parameter in accordance with the status of the storage request signal.

36. The moving image communication device as claimed in claim 35, wherein the data processor sets a parameter for generating a monochromatic image as the image quality correction parameter when the storage request signal is effective.

37. The moving image communication device as claimed in claim 24, further comprising an image processor for generating the image data, wherein the image processor comprises a motion detector for detecting an image motion in the image data, wherein a plurality of frame data which are continuous timewise constitute the image data, the motion detector appends a motion detection flag to each of the frame data and sets the motion detection flag of the frame data in which the image motion is detected to be effective, and the image processor sets a correction parameter for emphasizing an image of the frame data in which the motion detection flag is effective when the storage request signal is effective.

38. The moving image communication device as claimed in claim 24, wherein the data processor adjusts a frame rate at which the encoded data is stored in the buffer memory when the storage request signal is effective.

39. The moving image communication device as claimed in claim 38, wherein the data processor sets the frame rate to be higher than a transmission frame rate in an ordinary communication when the storage request signal is effective.

40. The moving image communication device as claimed in claim 24, wherein the data processor makes the encoder generate the encode data in a different manner in comparison to an ordinary communication when the storage request signal is effective.

41. The moving image communication device as claimed in claim 24, further comprising an image processor for generating the image data, wherein
the data processor makes the image processor generate the image data having an image size different to that of the image data in the ordinary communication when the storage request signal is effective.

42. The moving image communication device as claimed in claim 24, wherein the communication processor transmits and receives the storage request signal between the communication processor and the party on the other end in the network communication, and transfers the received storage request signal to the data processor upon the reception of the storage request signal from the other party in the network communication irrespective of communication conditions in the network.

43. The moving image communication device as claimed in claim 24, wherein
the communication processor receives the storage request signal from the party on the other end in the network communication without the generation of the storage request signal.

44. The moving image communication device as claimed in claim 24, further comprising:
a lens for imaging a photographic subject;
an image input unit for converting an optical image obtained by the lens into an electrical signal and generating digital image data from the electrical signal; and
an image processor for generating the image data by correcting the digital image data.

45. The moving image communication device as claimed in claim 24, further comprising:
an audio input device; and
an audio input unit for converting an audio signal outputted from the audio input device into digital audio data, and
an audio processor for signal-processing the audio data and transmitting the signal-processed data to the encoder, wherein
the encoder encodes the signal-processed audio data and the image data in synchronization with each other.

46. A moving image communication system comprising:
the moving image communication device as claimed in claim 24; and
a reproduction device for receiving the packet delivered by the moving image communication device, wherein
the reproduction device comprises a decoder for decoding the received packet.

47. A semiconductor integrated circuit for communicating a moving image provided with the moving image communication device as claimed in claim 24.

* * * * *